United States Patent [19]

Tkalcevic

[11] Patent Number: 5,056,051
[45] Date of Patent: Oct. 8, 1991

[54] SIGNAL DIRECTION FINDING PROCESSOR USING FAST FOURIER TRANSFORMS FOR RECEIVER MATCHING

[75] Inventor: Slobodan Tkalcevic, Fremont, Calif.

[73] Assignee: Technology for Communications International, Fremont, Calif.

[21] Appl. No.: 361,877

[22] Filed: Jun. 6, 1989

[51] Int. Cl.⁵ .............................................. G01S 7/40
[52] U.S. Cl. ........................ 364/571.05; 364/571.07; 340/870.04; 342/165; 342/174
[58] Field of Search ..................... 364/571.05, 571.06, 364/571.07, 576, 485, 574; 342/378, 165, 168, 173, 174; 340/870.04; 455/67, 226; 375/10, 34, 58; 371/23

[56] References Cited

U.S. PATENT DOCUMENTS

| | | | |
|---|---|---|---|
| 3,792,475 | 2/1974 | Smetana | 342/168 |
| 3,876,946 | 4/1975 | La Clair et al. | 364/576 X |
| 3,903,521 | 9/1975 | Jensen et al. | 342/148 |
| 4,227,249 | 10/1980 | Hansen | 375/34 |
| 4,264,959 | 4/1981 | Blaäss | 364/485 X |
| 4,320,400 | 3/1982 | Chasek | 342/378 |
| 4,328,552 | 5/1982 | Stovall | 342/168 |
| 4,351,062 | 9/1982 | Yoshiya | 364/576 X |
| 4,607,216 | 8/1986 | Yamaguchi et al. | 364/576 X |
| 4,619,002 | 10/1986 | Thro | 455/226 |
| 4,630,228 | 12/1986 | Tarczy-Hornock et al. | 364/576 |
| 4,642,642 | 2/1987 | Uurtamo | 342/174 |
| 4,646,254 | 2/1987 | O'Connor et al. | 364/574 |
| 4,658,367 | 4/1987 | Potter | 364/574 X |
| 4,677,581 | 6/1987 | Malka et al. | 364/571.06 |
| 4,754,282 | 6/1988 | Edelblute et al. | 342/378 X |
| 4,755,951 | 7/1988 | Hollister | 364/571.06 X |
| 4,884,078 | 11/1989 | Fishkin et al. | 342/174 |

Primary Examiner—Joseph L. Dixon
Attorney, Agent, or Firm—Townsend and Townsend

[57] ABSTRACT

The present invention is an improved direction finding (DF) processing system using digitally implemented spectral analysis. Both phase and amplitude responses are calibrated by comparing each spectrum "bin", or portion of the frequency bandwidth, to the other receiver or receivers output. A random noise source is used, with a large number of noise waveforms being measured and averaged. The average responses are then compared. The difference for each spectrum bin is stored in a passband calibration table. When the direction of origin of a signal of interest is later calculated using the difference in spectra for each bin, the value in the calibration table is first subtracted out.

3 Claims, 7 Drawing Sheets

SIGNAL DIRECTION FINDING PROCESSOR USING FAST FOURIER TRANSFORMS FOR RECEIVER MATCHING

BACKGROUND

The present invention relates to systems for determining the direction of origin of an electromagnetic signal. It is often desirable to determine from where a radio, data transmission or other signal is originating, especially in military applications. Direction finding (DF) systems receive a signal at a number of antennas connected to one or more receivers or receiver channels (one receiver may have many channels). The antenna signals are compared, usually by comparing the phase, so that a calculation can be done to determine the direction of origin of the signal. Usually more than one receiver is needed to process the signals from the different antennas or elements.

Since very small variations in the signal are being measured, the two or more receivers (or receiver "channels") must be very closely matched so that errors are not introduced by the receiver itself. This requires special IF (intermediate frequency) filters that must match each other. This is expensive even for two channels, and as more channels are added, it becomes even more expensive, especially when a failed unit must be replaced.

Recent advances in semiconductor technology have allowed various algorithms for calculating signal spectra to be used to process signals in the digital domain. One of these algorithms is the Fast Fourier Transform (FFT), and it has been suggested in the literature that an FFT phase interferometer direction-of-arrival system could be used and could correct for phase differences between channels in the digital domain, eliminating the need for matched analog filters. Such a discussion is contained in a treatise entitled "FFT Signal-Processing and System Applications", by E. Oran Brigham, published in 1988 by Prentice-Hall. A document entitled "Dual Channel Space Quadrature Inferometer System" by Peter Floyd and James Taylor, and distributed by Watkins-Johnson Company in 1986, discusses "chirping" a signal to do the calibration. In other words, one frequency after another is sequentially applied to each receiver channel, with the calibration being done for each frequency.

SUMMARY OF THE INVENTION

The present invention is an improved direction finding (DF) processing system using fast fourier transform (FFT) or other spectral analysis techniques. Both phase and amplitude responses are calibrated by comparing each FFT "bin", in the whole or in a portion of the frequency bandwidth, to the other receiver or receivers output. A random noise source is used, with a large number of noise waveforms being measured and averaged. The average receiver responses are then compared. The difference for each FFT bin is stored in a passband calibration table. When the direction of origin of a signal of interest is later calculated using the difference in FFTs for each bin, the value in the calibration table is first subtracted out, both for amplitude and phase.

The noise source eliminates the need for separately generating signals at each frequency; it eliminates the need for a signal generator which must be stepped across the frequency passband of the receivers. This increases the real time processing speed and reduces the cost of the system. The averaging of a large number of noise spectra allows the noise source to be used for both phase and amplitude calibration, even though any one noise waveform may have a very small value for some frequencies.

The system of the present invention uses a digital signal processing (DSP) board to perform the FFTs. Before receiver outputs can be sampled it is necessary to adjust receiver gain such that receiver output levels are most suitable for digitization. The analog to digital converters on the DSP board are used to sample receiver outputs and software determines required receiver gains which are then converted to analog form using digital-to-analog converters and fed directly to the AGC circuitry of the receiver. This direct gain control eliminates the need for receiver automatic gain control circuitry and an IEEE 488 or other interface type for control of gain. Because a number of iterations are typically required to adjust the gain for each new signal, this direct feedback shortens the time required for a gain adjustment when a new signal is detected.

The system performs a second unique calibration after the receiver gain has been adjusted for a particular signal. This gain adjustment may create a new mismatch between the receiver channels as different receiver channels may have different AGC characteristics. The FFTs are calculated and the FFT bin with the strongest signal is determined. The signals from the different receiver channels are then compared for this bin and the difference, both amplitude and phase, is calculated. The difference is then applied to all the bins in the passband calibration table since the gain will affect every frequency in the same manner.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
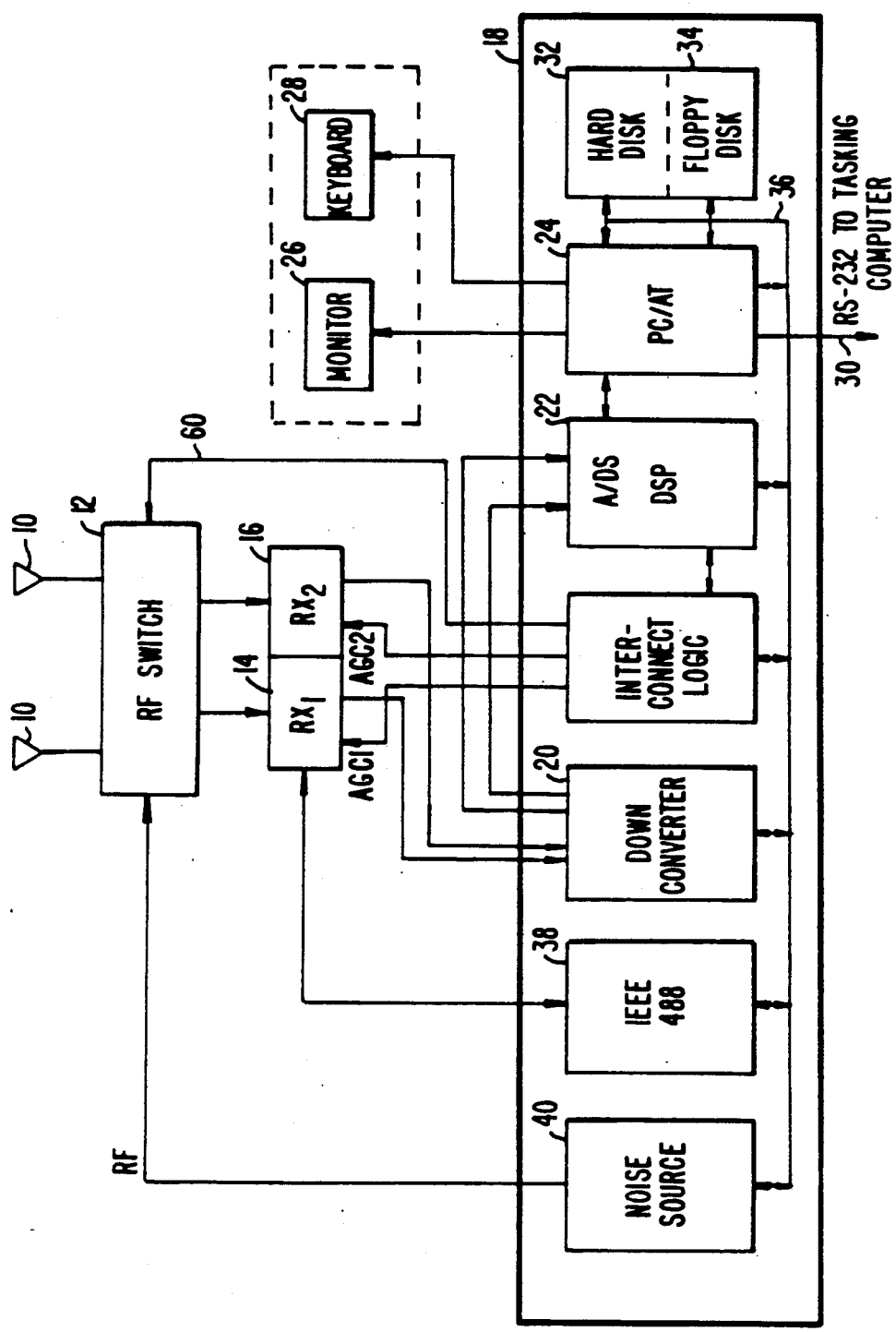
FIG. 1 is a block diagram of a DF system according to the present invention (it shows a two channel system, which can easily be extended to multiple channels)

FIG. 1 is a block diagram of one embodiment of the direction finding (DF) system according to the present invention. A plurality of antennas 10 are coupled to an RF switch 12. RF switch 12 provides a signal to a pair of receivers or receiver channels 14 and 16 (more channels could be used). The receivers in turn provide signals to a signal processing system 18 which includes a number of different circuit boards. Typically, the receivers and signal processing system are remote from the antennas 10 and RF switch 12 and are coupled via cabling.

RF switch 12 selects a particular antenna and couples it to a desired one of receiver channels 14 and 16. The receivers take the actual signals received and convert them into an intermediate frequency range and supply them to a downconverter board 20. Downconverter board 20 translates the signals into baseband signals and provides them to a digital signal processing (DSP) board 22. DSP board 22 performs the signal digitization and the fast fourier transforms (FFTs) or similar algorithms for spectrum calculation under the direction of a computer board 24. Computer board 24 may be coupled to a monitor 26 and a keyboard 28. Alternately, board 24 may be under the control of a remote tasking computer via a serial RS-232 port 30 or other interface. Computer board 24 is preferably a PC/AT compatible board. A hard disk 32 and a floppy disk 34 are connected to PC/AT board 24 via a signal processing system bus 36 to provide the needed storage memory.

An IEEE 488 board 38 can be used to provide control signals for the frequency and bandwidth setting of receivers 14 and 16. A noise source 40 is coupled to receivers 14 and 16 through RF switch 12 in order to calibrate the system as discussed below.

DSP board 22 can be a commercially available board such as the DSP 56001 system board produced by Spectrum Signal Processing, Inc. of Burnaby, British Columbia, Canada. The DSP board includes its own processor, RAM and EPROM memory, analog-to-digital converters (ADCs) with sample and hold, filters, latches, digital-to-analog converters (DACs) and other circuitry. For DF systems with more than two channels there can be a separate ADC card.

In operation, RF switch 12 provides signals from antennas 10 to receiver channels 14 and 16. More receiver channels may be used in other embodiments. Typically, one receiver is used as the reference and is connected to one antenna, while the other antennas are alternately coupled to the other receiver channel(s). The signals received from the non-referenced antennas are compared to the signals of the referenced antenna in order to determine differences indicating the direction of the origin of the signal. Some systems rely on the phase of the received signals while the unique wave front analysis system produced by TCI (Technology for Communications International) uses both phase and amplitude differences. In the prior art, receiver channels 14 and 16 (and all other channels in multiple channel systems) had to have very closely matched components so that errors were not introduced by the receivers themselves. In the present invention, receiver channels 14 and 16 (and all other channels in multiple channel systems) can be relatively inexpensive, unmatched receivers with the software adjusting the received signals in digital form to compensate for differences in the receivers.

Figure 2:
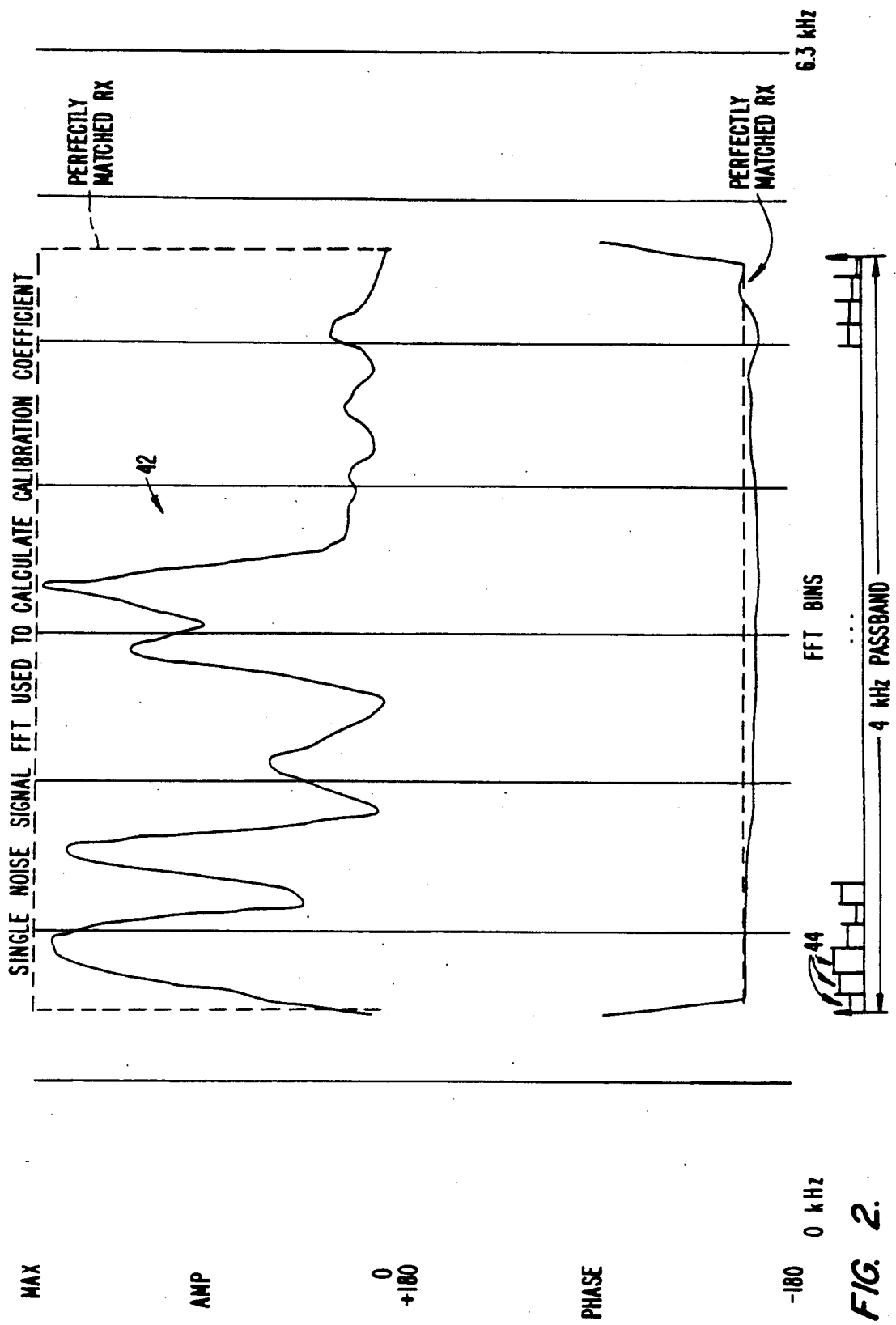
FIG. 2 is a graph of a single noise signal waveform used for calibration.
Figure 3:
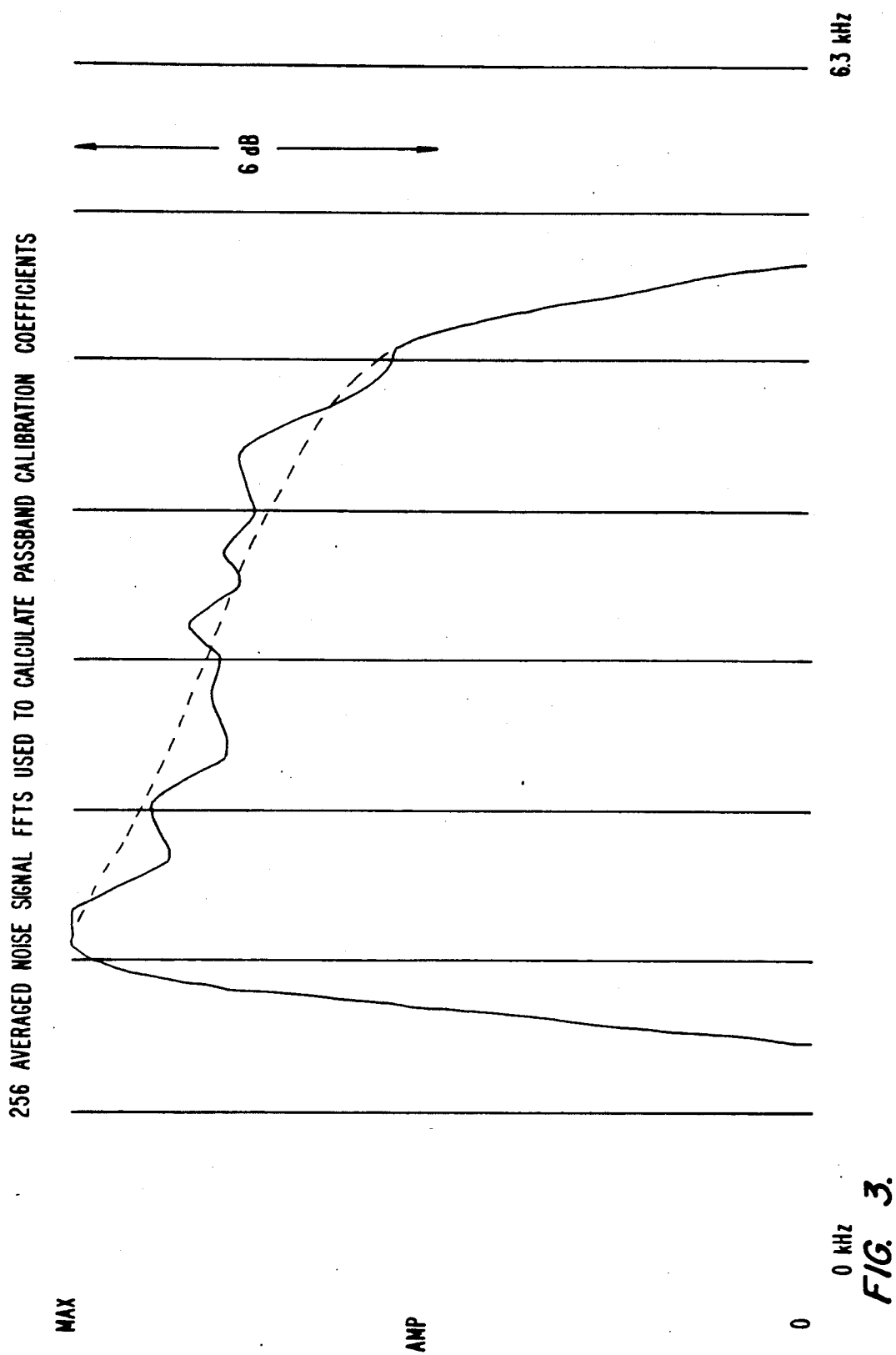
FIG. 3 is a graph of an average noise signal amplitude used for amplitude calibration.
Figure 4:
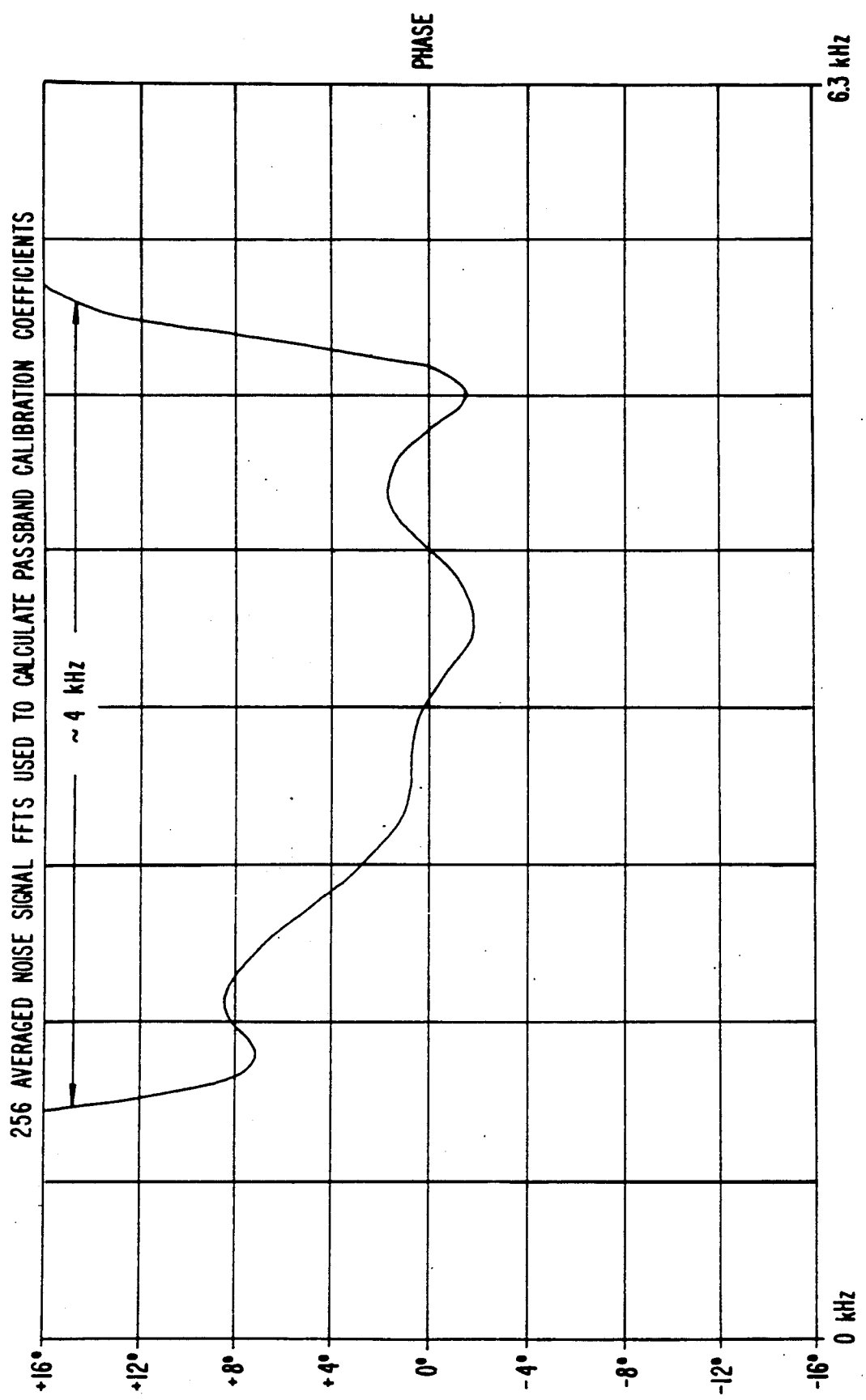
FIG. 4 is a graph of the average noise phase used for calibration.

The signal from downconverter 20 is processed on DSP board 22 using FFTs to give a value for each FFT bin of the passband in a known manner. FIG. 2 shows an example of such bins for a particular noise waveform 42. A 4 kHz passband is shown, which corresponds to the frequency signals allowed to pass through the filters which are tuned to center on a frequency signal of interest. A number of bins 44 are shown at the bottom of the figure. Each of these bins contain a digital value corresponding to the FFT of the signal in that small portion of the passband. Each bin includes both amplitude and phase information for the received signal. In the example shown, the digital value in the bins is larger or smaller depending upon the amplitude of the waveform shown. As can be seen, for a random noise signal, the value may be zero at some point, thus giving no information for a particular bin. For this reason, a large number of samples are taken during calibration and the values averaged to produce an averaged amplitude difference such as shown in FIG. 3. An averaged phase difference is shown in FIG. 4.

The FFT bins (including phase and amplitude information) each have a value corresponding to the average noise (amplitude and phase) spectra. Separate average values for all bins in the passband are recorded for each receiver using the same noise input through RF switch 12. The difference between the value of the average amplitude for the two or more receiver channels and the value of the average phase for the two or more receiver channels in any particular FFT bin is then recorded as a correction coefficient to be applied to DF calculations during operation of the system.

Figure 5:
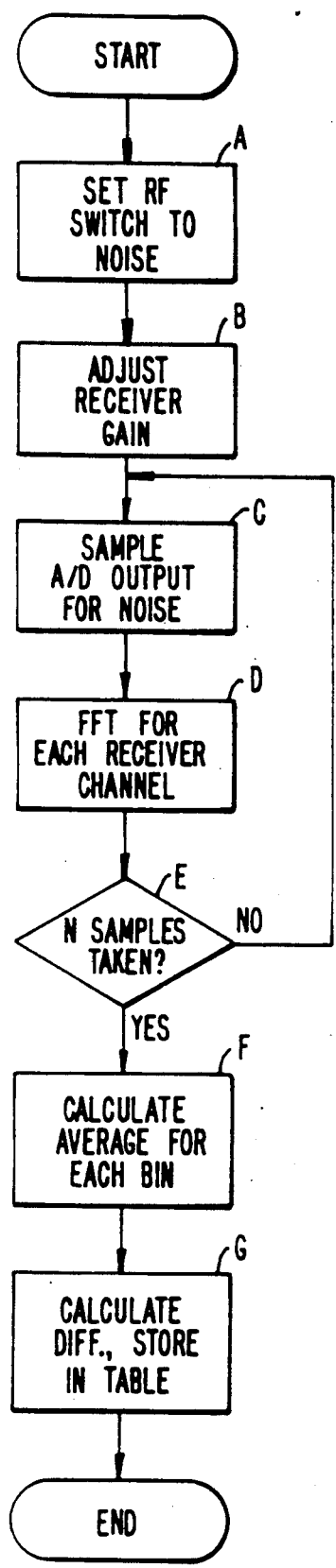
FIG. 5 is a flowchart of the original calibration using the noise source.

FIG. 5 is a flowchart of the initial calibration of the present invention. The RF switch 12 is first set to receive the noise source input (step A) and receiver gain is adjusted to provide the correct output level (step B). Once gain is adjusted a sample of the received output from the noise generator is taken at a point in time (step C) and an FFT is done for each receiver yielding amplitude and phase for each bin (step D). This is repeated multiple times to give multiple samples (step E). The value in each bin is then averaged (step F) and the difference between the averages for each receiver are calculated and stored in an initial coefficient (calibration) table (step G).

The original calibration shown in FIG. 5 may be periodically, but infrequently performed. The calibration needs to be repeated because components in the receivers will age over time and their amplitude and phase characteristics may vary with temperature.

Figure 6:
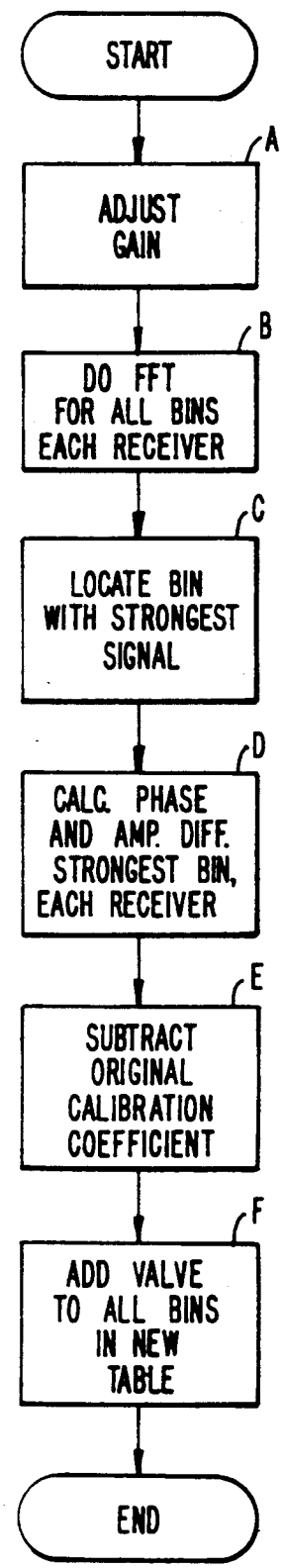
FIG. 6 is a flowchart of the second calibration after a gain adjustment.

FIG. 6 shows a flowchart of the second calibration when the system is in operation and the gain of the receivers has been adjusted for a particular signal. After the gain has been adjusted (step A) there may be further differences in the two or more receiver channels because of the new gain being used as compared to the gain used for the initial passband calibration of FIG. 5. An FFT is done (step B) and the bin with the strongest signal amplitude is located (step C). The phase and amplitude values for the two or more receiver channels for this bin are then compared and the difference is calculated (step D). The initial calibration coefficient for this bin (as determined according to FIG. 5) is then subtracted out (step E) to give a value due to the change in gain only. This value, for both amplitude and phase, is then added to all of the calibration coefficients in the coefficient table to give a new coefficient correction table for the signal being monitored (step F).

By locating the bin with the strongest signal and only calculating the differences for this bin, the time of the calculation is greatly reduced. The adjustment in gain will affect all of the bins equally, thus allowing this abbreviated method to be used. Since the system may often be switched from one signal to another, it is important that this adjustment be done quickly when each new signal is monitored.

Figure 7:
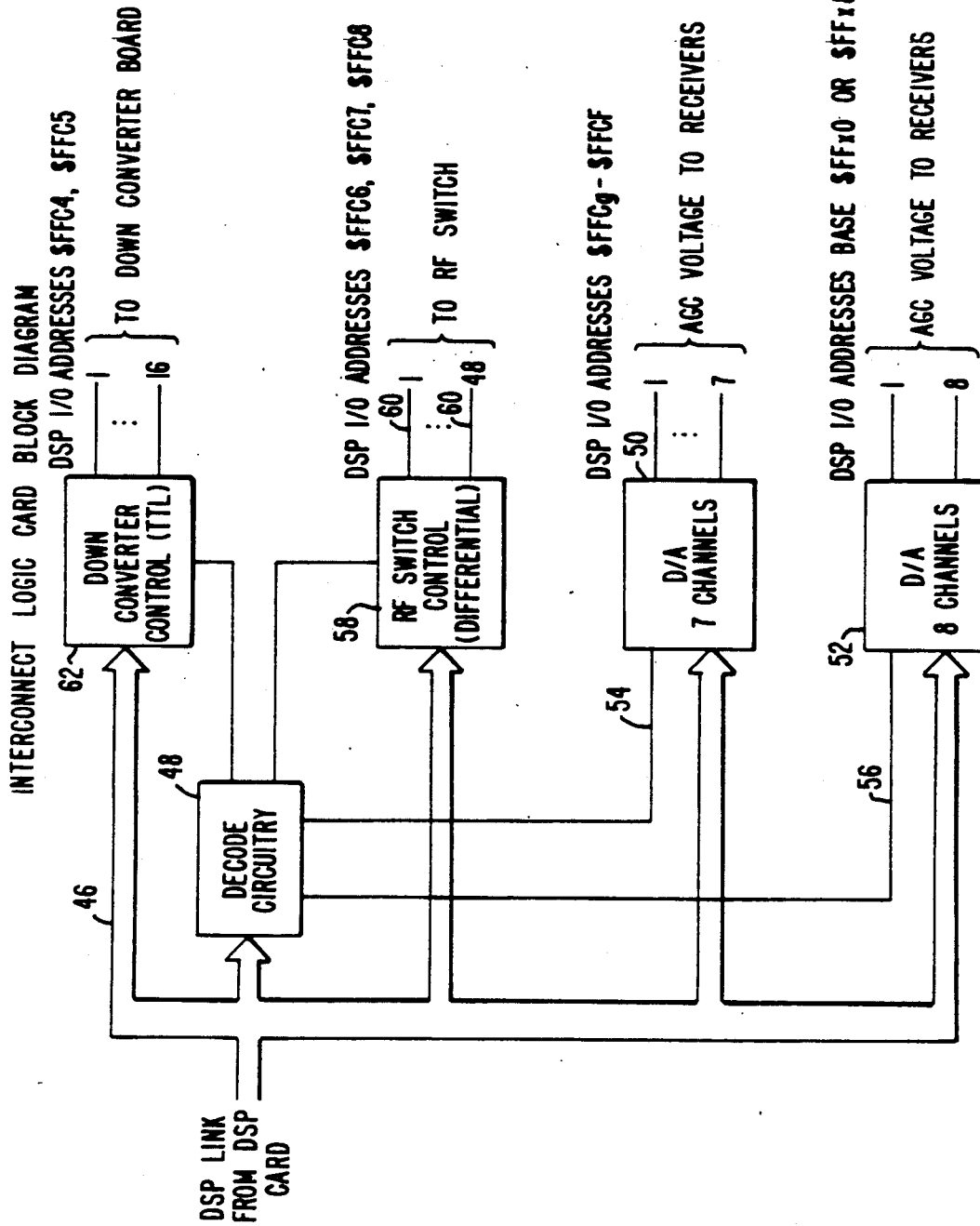
FIG. 7 is a block diagram of the interconnect logic board of FIG. 1.

FIG. 7 is a block diagram of the interconnect logic card. A digital bus 46 from DSP card 22 is provided to decoding circuitry 48 and a pair of digital-to-analog converter circuits 50 and 52. Circuit 50 can provide analog AGC voltage signals to 7 receivers, while circuit 52 can supply 8 separate receivers. The circuits themselves may consist of multiple D/A converters or a single D/A converter and multiplexing logic. Control signals on lines 54 and 56 from decode circuitry 48 select the appropriate output channel. The outputs from the D/A converters 50 and 52 are shown as signals AGC1 and AGC2 in FIG. 1.

This circuitry provides for a more direct gain control by eliminating the need to provide gain control signals through IEEE 488 board which then transmits a digital signal to the receivers. The receivers would then have to convert the digital signals from IEEE 488 board and decode them to provide the appropriate analog signal for the internal AGC of the receivers. The receivers are modified to receive the external input from the interconnect logic board or receivers are chosen with an external AGC jack already provided. Thus, the DSP board can convert the signal level into digital form where it can be analyzed and an appropriate control can be sent directly through D/A circuits 50 and 52 of FIG. 7 to the receivers. Since multiple iterations may be necessary to achieve the appropriate gain for each new signal, the improved speed of this invention is valuable.

FIG. 7 also shows RF switch control circuit 58. Digital signals from bus 46 are converted into 48 differential signals on output lines 60. Two wire, differential signals are used because there is typically a great distance between RF switch 12 of FIG. 1 and the interconnect logic board. The 48 bits allow a large number of antennas 10 to be coupled to a large number of receivers. RF switch 12 decodes the signals sent to decide which antennas are coupled to which receiver.

FIG. 7 also shows a downconverter control logic circuit 62. This provides control signals to downconverter board 20, as shown in more detail in FIG. 8.

Figure 8:
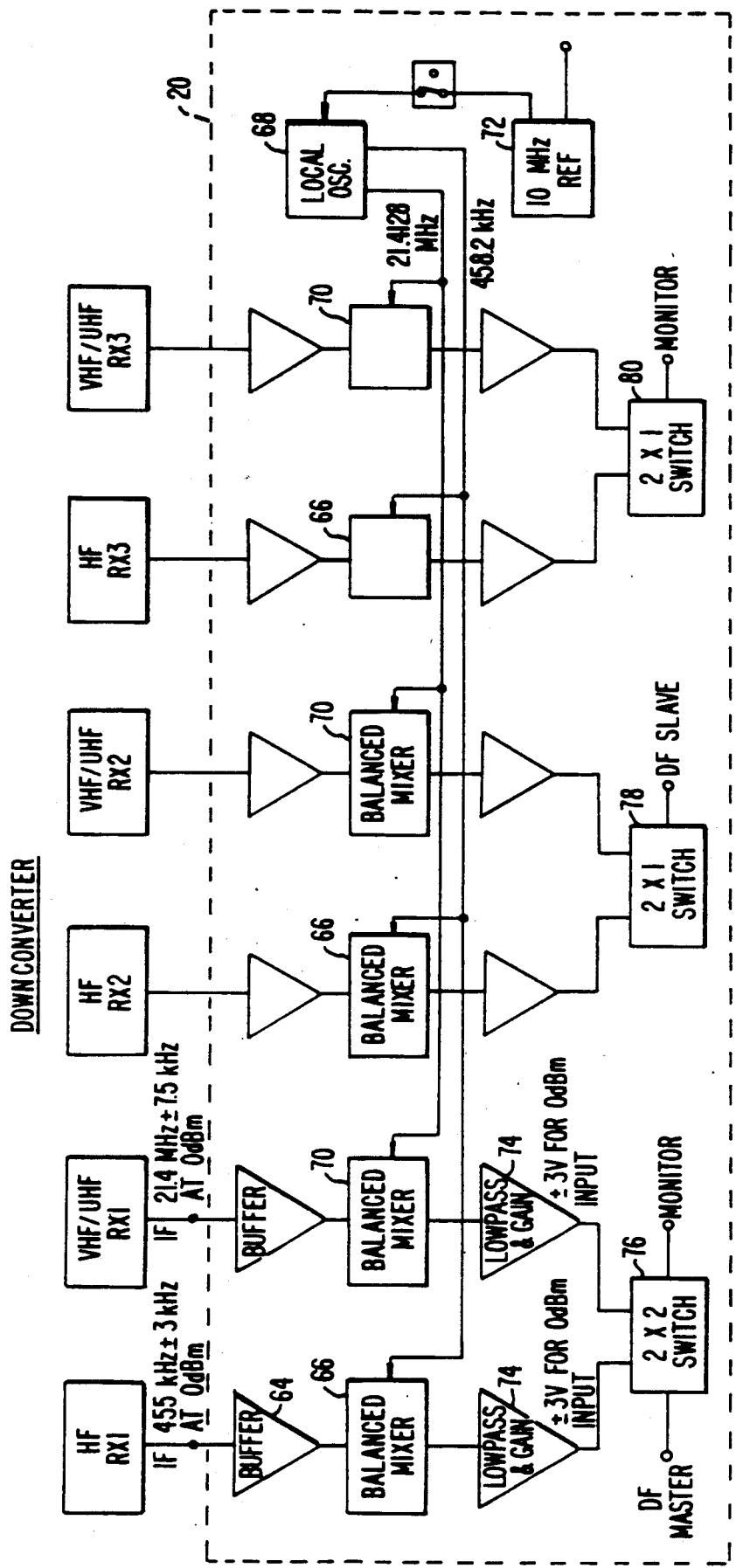
FIG. 8 is a block diagram of the downconverter board of FIG. 1.

The downconverter board shown in FIG. 8 is represented by dotted lines 20. Six receivers are shown. Three physical receivers would be used, however, with each having a HF and a VHF/UHF output depending upon the frequency range being monitored. These are labeled receivers RX1-RX3.

Each receiver input is provided through a buffer 64 and a balanced mixer 66. The mixer receives an input from local oscillators 68 which provide a 458.2 kHz signal to the HF mixers 66 and a 21.4128 MHz signal to VHF/UHF mixers 70. (The frequencies noted here will vary for different receiver manufacturers). Local oscillator 68 operates off of a 10 MHz reference oscillator 72. The output of each mixer is provided through low pass filter and gain circuits 74 to provide a baseband signal to one of switches 76, 78 and 80. Switch 80 is used to provide a signal to a monitor in applications where a user wants to actually listen to the signal whose direction is being monitored. Switch 76 can also be connected to a monitor (such as a visual display monitor) or it can be connected to DSP board 22 as the "master" channel for the reference antenna. Switch 78 is used to provide a signal to DSP board 22 for all the other antennas which are compared to the master antenna. The selection of the master antenna can be done through RF switch 12 of FIG. 1.

As will be understood by those familiar with art, the present invention may be embodied in other specific forms without departing from the spirit or essential characteristics thereof. For example, multiple receivers or receiver channels could be used or a single VHF/UHF antenna or large circular HF array could be used instead of individual antennas. Accordingly, the disclosure of the preferred embodiment of the invention is intended to be illustrative, but not limiting, of the scope of the invention which is set forth in the following claims.

What is claimed is:

1. A calibration apparatus for a signal processing system having at least two receiver channels, comprising:
    a noise source coupled to an input of each of said receiver channels for providing signals across a passband of said receiver channels;
    at least two analog-to-digital converters, each coupled to an output of one of said receivers;
    at least two downconverters, each coupled between said one of said receiver channels and one of said analog-to-digital converters for converting an intermediate frequency from the receiver channel to a baseband frequency;
    digital signal processing means coupled to said analog-to-digital converters for taking a plurality of samples of the outputs of said analog-to-digital converters, performing a spectral analysis on each of a plurality of portions of each sample from each receiver channel across said passband, averaging the results of the spectral analysis for each portion and determining a calibration difference between each average portion for one receiver channel and the corresponding average portion for the other receiver channel;
    a memory table for storing said calibration difference for each portion so that said difference can be used as an offset for measurements of the difference between signals from said two receiver channels;
    said digital signal processing means including means for determining which of said portions has a strongest signal amplitude from spectral analysis for a sample from each of said receiver channels, determining a gain difference between receiver channels for the portion having a strongest signal amplitude and modifying said calibration difference for each of said portions by a difference between said calibration difference and said gain difference for said portion having a strongest signal amplitude;
    a second memory table for storing said modified calibration differences; and
    programmed computer means for determining a direction of origin of a signal received by said receivers by comparing a difference in phase from a spectral analysis of a plurality of portions of a sample of said signal from said two receiver channels, said difference in phase being offset by said modified calibration difference.

2. The apparatus of claim 1 wherein said difference between each average portion comprises both a phase difference and an amplitude difference, said memory tables storing both said amplitude and said phase differences.

3. The apparatus of claim 1 further comprising:
    at least first and second digital-to-analog converts, each having an output coupled to an external AGC input of one of said receiver channels; and
    means for providing digital inputs to said digital-to-analog converters in response to digital values from said analog-to-digital converters to set the gain for an input signal to said receiver channels.

* * * * *

UNITED STATES PATENT AND TRADEMARK OFFICE
CERTIFICATE OF CORRECTION

PATENT NO.   : 5,056,051
DATED        : October 8, 1991
INVENTOR(S)  : Slobodan Tkalcevic It is certified that error appears in the above-identified patent and that said Letters Patent is hereby corrected as shown below:

In the Drawings

On sheet 5 of 7, Block F, delete the word "VALVE" and replace it with the word --VALUE--.

Signed and Sealed this

Twenty-seventh Day of April, 1993

*Attest:*

MICHAEL K. KIRK

*Attesting Officer*      *Acting Commissioner of Patents and Trademarks*